United States Patent
Mese et al.

(10) Patent No.: US 9,438,725 B1
(45) Date of Patent: Sep. 6, 2016

(54) INTELLIGENT COMMUNICATION DISCONNECT

(71) Applicant: LENOVO (Singapore) PTE, LTD., New Tech Park (SG)

(72) Inventors: John Carl Mese, Cary, NC (US); Nathan J. Peterson, Durham, NC (US); Russell Speight VanBlon, Raleigh, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/639,858

(22) Filed: Mar. 5, 2015

(51) Int. Cl.
*H04M 3/42* (2006.01)

(52) U.S. Cl.
CPC ..................................... *H04M 3/42* (2013.01)

(58) Field of Classification Search
CPC ................... H04L 29/08108; H04M 2207/18; H04M 3/42; H04W 4/02; H04W 8/18; G06Q 30/02
See application file for complete search history.

(56) References Cited

U.S. PATENT DOCUMENTS

| | | | |
|---|---|---|---|
| 2011/0230184 A1* | 9/2011 | Tal ..................... | H04M 3/42374 455/425 |
| 2011/0294548 A1* | 12/2011 | Jheng .................. | H04L 12/1818 455/558 |
| 2014/0253740 A1* | 9/2014 | Barnwal ................. | G06F 3/005 348/207.1 |

* cited by examiner

*Primary Examiner* — Ted Wang
(74) *Attorney, Agent, or Firm* — Kunzler Law Group

(57) ABSTRACT

An apparatus, method, system, and program product are disclosed for intelligent communication disconnect. A monitor module is configured to detect a disconnection cue during an ongoing communication between a plurality of users. The disconnection cue includes a disconnection phrase that indicates the completion of the ongoing communication. A disconnection module is configured to disconnect from the ongoing communication in response to the disconnection cue.

18 Claims, 4 Drawing Sheets

INTELLIGENT COMMUNICATION DISCONNECT

FIELD

The subject matter disclosed herein relates to telecommunications and more particularly relates to intelligently disconnecting from an ongoing communication.

BACKGROUND

Description of the Related Art

In general, a user can manually end an ongoing communication in various ways, such as by hanging-up a telephone call. Sometimes, however, a user may forget to manually end the connection, which may lead to potentially embarrassing situations where a user's private conversation is unwittingly overheard. Moreover, a device's power can be unnecessarily expended by maintaining an active, but unused, connection to an ongoing communication.

BRIEF SUMMARY

An apparatus for intelligent communication disconnect is disclosed. A method and computer program product also perform the functions of the apparatus. In one embodiment, an apparatus includes a processor and a memory that stores code executable by the processor. In certain embodiment, the code includes code that detects a disconnection cue during an ongoing communication between a plurality of users. In some embodiments, the disconnection cue includes a disconnection phrase that indicates the completion of the ongoing communication.

In one embodiment, the code includes code that disconnects from the ongoing communication in response to the disconnection cue. In a further embodiment, the code includes code that associates a disconnection phrase with a user of the plurality of users such that communications with the user are disconnected in response to detecting the disconnection phrase associated with the user. In some embodiments, a disconnection phrase is associated with the user in response to the disconnection phrase being assigned to the user. In certain embodiments, a disconnection phrase is associated with the user in response to determining the disconnection phrase was used prior to disconnecting a communication with the user.

In one embodiment, the disconnection cue further comprises input received from one or more sensors. In a further embodiment, the one or more sensors comprise one or more of an accelerometer, a proximity sensor, and an orientation sensor. In some embodiments, the disconnection cue further comprises a period of time without receiving input after detecting the disconnection phrase. In various embodiments, the code further includes code that determines whether a mute setting is enabled. In some embodiments, the ongoing communication is disconnected in response to the mute setting being disabled.

In one embodiment, the code further includes code that determines whether a user was placed on hold during the ongoing communication. In certain embodiments, a connection to the user is restored in response to disconnecting from the ongoing communication. In various embodiments, the code further includes code that sends a notification that the ongoing communication has not been disconnected. In some embodiments, the ongoing communication comprises a telephone communication.

A method includes detecting, by use of a processor, a disconnection cue during an ongoing communication between a plurality of users. The disconnection cue may include a disconnection phrase that indicates the completion of the ongoing communication. In a further embodiment, the method includes disconnecting from the ongoing communication in response to the disconnection cue.

In one embodiment, the method includes associating a disconnection phrase with a user of the plurality of users such that communications with the user are disconnected in response to detecting the disconnection phrase associated with the user. In some embodiments, a disconnection phrase is associated with the user in response to the disconnection phrase being assigned to the user. In a further embodiment, a disconnection phrase is associated with the user in response to determining the disconnection phrase was used prior to disconnecting a communication with the user.

In one embodiment, the disconnection cue further comprises input received from one or more sensors. In a further embodiment, the disconnection cue further comprises a period of time without receiving input after detecting the disconnection phrase. In some embodiments, the method includes determining whether a mute setting is enabled. In certain embodiments, the ongoing communication is disconnected in response to the mute setting being disabled. The method, in various embodiments, includes sending a notification that the ongoing communication has not been disconnected.

A program product, in one embodiments, includes a computer readable storage medium that stores code executable by a processor. In one embodiment, the executable code includes code that performs detecting a disconnection cue during an ongoing communication between a plurality of users. In certain embodiments, the disconnection cue comprising a disconnection phrase that indicates the completion of the ongoing communication. In a further embodiment, the executable code includes code that performs disconnecting from the ongoing communication in response to the disconnection cue.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
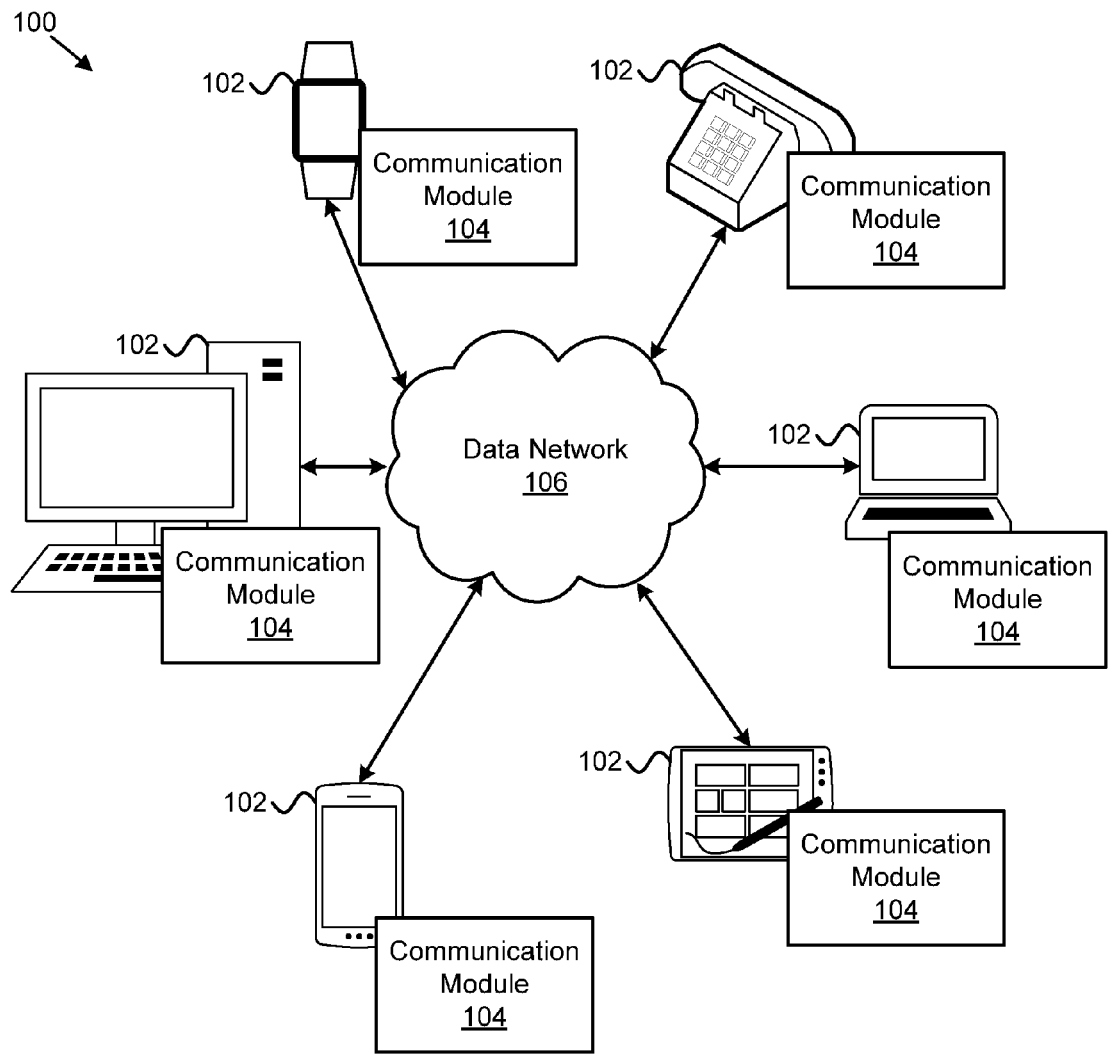
FIG. 1 is a schematic block diagram illustrating one embodiment of a system for intelligent communication disconnect.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a system 100 for intelligent communication disconnect. In one embodiment, the system 100 includes information handling devices 102, communication modules 104, and data networks 106. Even though a specific number of information handling devices 102, communication modules 104, and data networks 106 are depicted in FIG. 1, one of skill in the art will recognize that any number of information handling devices 102, communication modules 104, and data networks 106 may be included in the system 100.

In one embodiment, the information handling devices 102 comprise computing devices, such as desktop computers, laptop computers, personal digital assistants (PDAs), tablet computers, smart phones, smart televisions (e.g., televisions connected to the Internet), set-top boxes, game consoles, or the like. In some embodiments, the information handling devices 102 comprise wearable devices, such as smart watches, fitness bands, optical head-mounted displays, or the like. In certain embodiments, the information handling devices 102 are configured to create and receive voice communications with a plurality of users, e.g., a telephone.

In some embodiments, the information handling devices 102 may include servers, such as application servers, email servers, database servers, file servers, game servers, home servers, media servers, web servers, and/or the like. In certain embodiments, the servers are communicatively coupled to other information handling devices 102 via the data network 106 such that the information handling devices 102 may store and/or access data on the servers as it relates to the communication module 104.

In one embodiment, the communication module 104 is configured to detect a disconnection cue during an ongoing communication between a plurality of users, such as a telephone call between two users or a conference call involving multiple users. In some embodiments, the disconnection cue includes a disconnection phrase that indicates the completion of the ongoing communication. The communication module 104, in certain embodiments, is also configured to disconnect from the ongoing communication in response to the disconnection cue. In this manner, the communication module 104 determines when users have finished their conversation and can disconnect a user from the conversation, such as by hanging-up the user's phone, in situations where the user forgets to manually disconnect from the conversation. This may help avoid unnecessary power consumption on the user's information handling device 102 and also avoid potentially embarrassing situations where a user's private conversation is overheard.

The data network 106, in one embodiment, comprises a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

Figure 2:
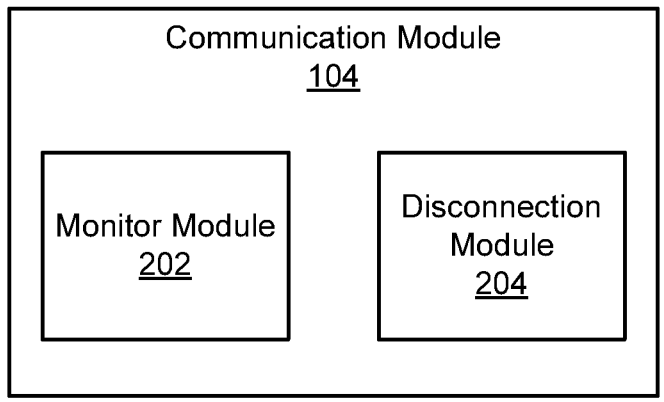
FIG. 2 is a schematic block diagram illustrating one embodiment of a module for intelligent communication disconnect.

FIG. 2 is a schematic block diagram illustrating one embodiment of a module 200 for intelligent communication disconnect. In one embodiment, the module 200 includes an embodiment of a communication module 104. In certain embodiments, the communication module 104 includes one or more of a monitor module 202 and a disconnection module 204, which are described in more detail below.

In one embodiment the monitor module 202 is configure to detect a disconnection cue during an ongoing communication between a plurality of users. In some embodiments, the ongoing communication may comprise a telephone conversation between two users, a conference call involving multiple users, a conversation using telecommunications application software (e.g., Skype™) or voice over IP (VoIP)

software (e.g., Vonage™), which may use softphones to make and receive voice and video calls over an IP network, or the like.

A disconnection cue, as used herein, may comprise a disconnection phrase, sensor input, a timeout period, or the like, that indicates the completion of an ongoing communication, such as a telephone conversation. In one embodiment, the disconnection cue comprises a disconnection phrase received from a user participating in the communication. For example, the disconnection phrase may include phrases such as "Goodbye," "Love you," "See ya later," "Sounds good," "OK, thanks, bye," "Later," or the like that generally indicates the completion of a conversation.

In certain embodiments, the disconnection cue includes sensor input that indicates the completion of a conversation. In one embodiment, the monitor module 202 may receive sensor input from one or more sensors of a device 102 used during the ongoing communication, such as a smart phone, a headset, or the like. In some embodiments, the sensors include accelerometers, orientation sensors, proximity sensors, or the like. For example, the monitor module 202 may receive sensor input from an accelerometer indicating that a smart phone has been set down, such as on a table, or placed in a user's pocket, or the like. In one embodiment, the sensor input comprises determining the user disconnected a headset from the communication device 102. For example, the monitor module 202 may detect when a user disconnects a Bluetooth® headset, a wired headset, a wireless headset, or the like, which may indicate that the user is finished with the communication.

In a further embodiment, the disconnection cue includes a period of time, e.g., a timeout period, without receiving input from a participant of the ongoing communication. In some embodiments, the timeout period may comprise a number of seconds, minutes, or the like since a user said anything during the conversation. In one embodiment, the monitor module 202 begins the timeout period after detecting a disconnection phrase. For example, if the monitor module 202 detects a disconnection phrase, such as "goodbye," the monitor module 202 may begin a timer to determine the timeout period since the user said "goodbye." In some embodiments, the monitor module 202 begins the timer in response to not detecting any input for a predetermined period of time. For example, if no voice input is detected for one minute, the monitor module 202 may begin the timer for the timeout period, even though a disconnection phrase was not received. In one embodiment, if input is received after the monitor module 202 detects the disconnection phrase, the monitor module 202 may reset the timer.

In one embodiment, the disconnection module 204 is configured to disconnect a user from the ongoing communication in response to the monitor module 202 detecting the disconnection cue. For example, the disconnection module 204 may end a telephone conversation by hanging-up a user's telephone. In this manner, the communication module 104 may disconnect a user from an ongoing communication that the user may think has ended, but has not yet been manually disconnected, by detecting a disconnection cue (e.g., a disconnection phrase, sensor input, the expiration of a timeout period, or a combination of the foregoing), and, in response to the disconnection cue, disconnecting the user from the ongoing communication.

Figure 3:
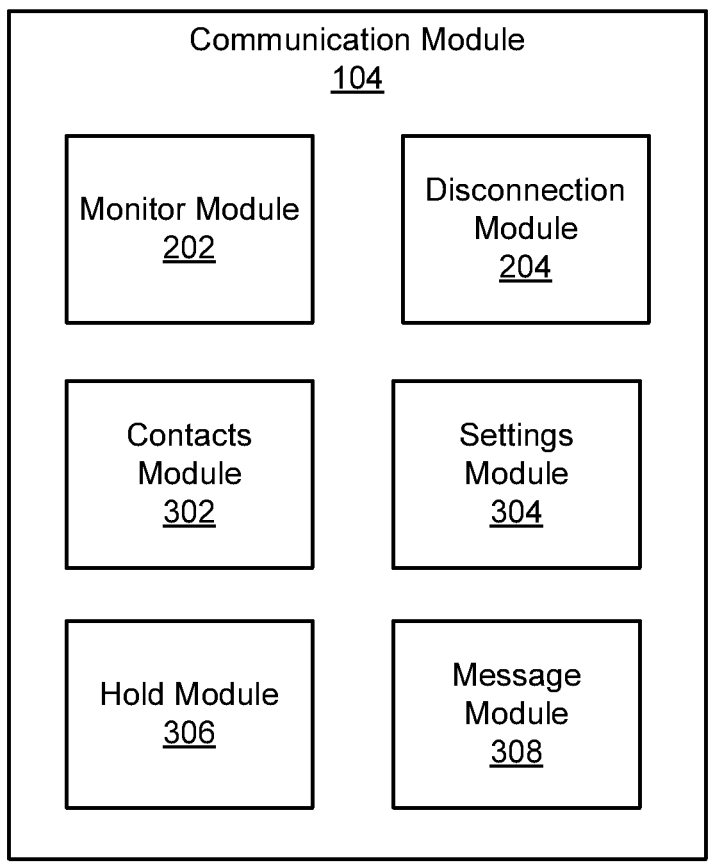
FIG. 3 is a schematic block diagram illustrating one embodiment of another module for intelligent communication disconnect.

FIG. 3 is a schematic block diagram illustrating one embodiment of another module 300 for intelligent communication disconnect. In one embodiment, the module 300 includes an embodiment of a communication module 104. The communication module 104 may include one or more of a monitor module 202 and a disconnection module 204, which may be substantially similar to the monitor module 202 and the disconnection module 204 described above with reference to FIG. 2. In certain embodiments, the communication module 104 includes one or more of a contacts module 302, a settings module 304, a hold module 306, and a message module 308, which are described in more detail below.

In one embodiment, the contacts module 302 is configured to associate a disconnection phrase with a user such that communications with the user are disconnected in response to detecting the disconnection phrase associated with the user. For example, the contacts module 302 may associate the phrase "Love you" with a user's mother such that the monitor module 202 detects the phrase "Love you" as a disconnection cue when the user is talking with his mother.

In one embodiment, the contacts module 302 associates a disconnection phrase with a user in response to the disconnection phrase being assigned to a user. For example, the contacts module 302 may associate the disconnection phrase "later" with a user's best friend in response to the user manually assigning the phrase to his best friend's contact information. Thus, in some embodiments, the monitor module 302 disconnects the user from a telephone conversation with his best friend in response to detecting the phrase "later" instead of a different disconnection phrase that may not have been assigned to the user's best friend.

In a further embodiment, the contacts module 302 associates a disconnection phrase with a user in response to determining the disconnection phrase was used prior to disconnecting a communication with the user. For example, in response to the contacts module 302 detecting a user saying "ok, love you" before hanging-up with his wife, the contacts module may associate or assign the phrase "ok, love you" as the disconnection phrase for his wife. Thus, the contacts module 302 may learn or otherwise determine which disconnection phrases the user speaks to different contacts as the user converses with his contacts and assigns the learned disconnection phrases to the user's contacts.

In one embodiment, the settings module 304 is configured to determine whether a mute setting is enabled. As used herein, a mute setting is a setting on a communications device, such as a telephone, that mutes the microphone, or other voice input device, such that input is not received by the microphone. An enabled mute setting may be an indicator that the user is still involved in the ongoing communication, but is only passively participating by listening to the conversation.

In one embodiment, if the settings module 304 determines that the mute setting is enabled, the disconnection module 204 may not disconnect from the ongoing communication, even if one or more disconnection cues are detected by the monitor module 202. For example, if the monitor module 202 detects that the user does not say anything for the timeout period in response to detecting a disconnection phrase, the disconnection module 204 may not disconnect the user from the ongoing communication if the settings module 304 determines that the mute setting is enabled. On the other hand, if the settings module 304 determines that the mute setting is disabled, the disconnection module 204 may disconnect the user from the ongoing communication in response to a disconnection cue.

In one embodiment, the hold module 306 is configured to determine whether a user was placed on hold prior to or during the connection to the ongoing communication. As used herein, a user may be place on hold, in which case the connection is not terminated, but no verbal communication is possible until the call is removed from hold. In one embodiment, the hold module 306, in response to determining that a user has been placed on hold, restores the connection to the user on hold in response to the disconnection module 204 disconnecting from the ongoing communication. In a further embodiment, the hold module 306 disconnects the inactive connection to the user on hold in response to the disconnection module 204 disconnecting from the ongoing communication. In some embodiments, the message module 308, described below, notifies the user that a connection with a user on hold still exists. The user may choose whether to switch to the connection with the user on hold or disconnect the connection.

In one embodiment, the message module 308 is configured to send a notification that the ongoing communication has not been disconnected. For example, instead of the disconnection module 204 automatically disconnecting from the ongoing communication in response to a disconnection cue, the message module 308 may notify the user that the connection is still active and may prompt the user to either continue the communication or disconnect from the communication. In some embodiments, the message may comprise a text message, an audio indicator, a visual indicator, or the like. In some embodiments, the message module 308 sends a notification to a user on the opposite end of the communication to inform him/her that the communication has been disconnected.

Figure 4:
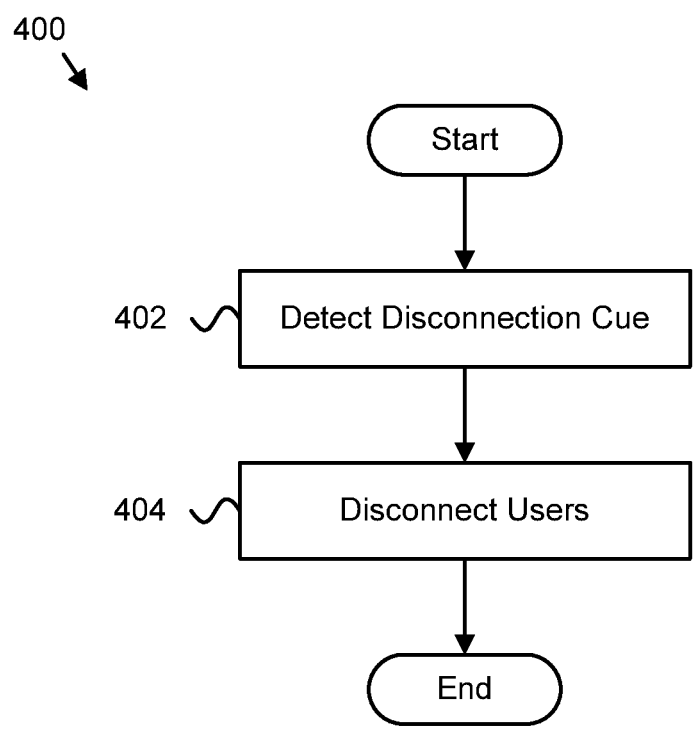
FIG. 4 is a schematic flow chart diagram illustrating one embodiment of a method for intelligent communication disconnect.

FIG. 4 is a schematic flow chart diagram illustrating one embodiment of a method 400 for intelligent communication disconnect. In one embodiment, the method 400 begins and the monitor module 202 detects 402 a disconnection cue during an ongoing communication between a plurality of users. In one embodiment, the disconnection cue includes a disconnection phrase, sensor input, and/or a period of time without receiving input, that indicates the completion of the ongoing communication. In a further embodiment, the disconnection module 204 disconnects 404 from the ongoing communication in response to the disconnection cue, and the method 400 ends.

Figure 5:
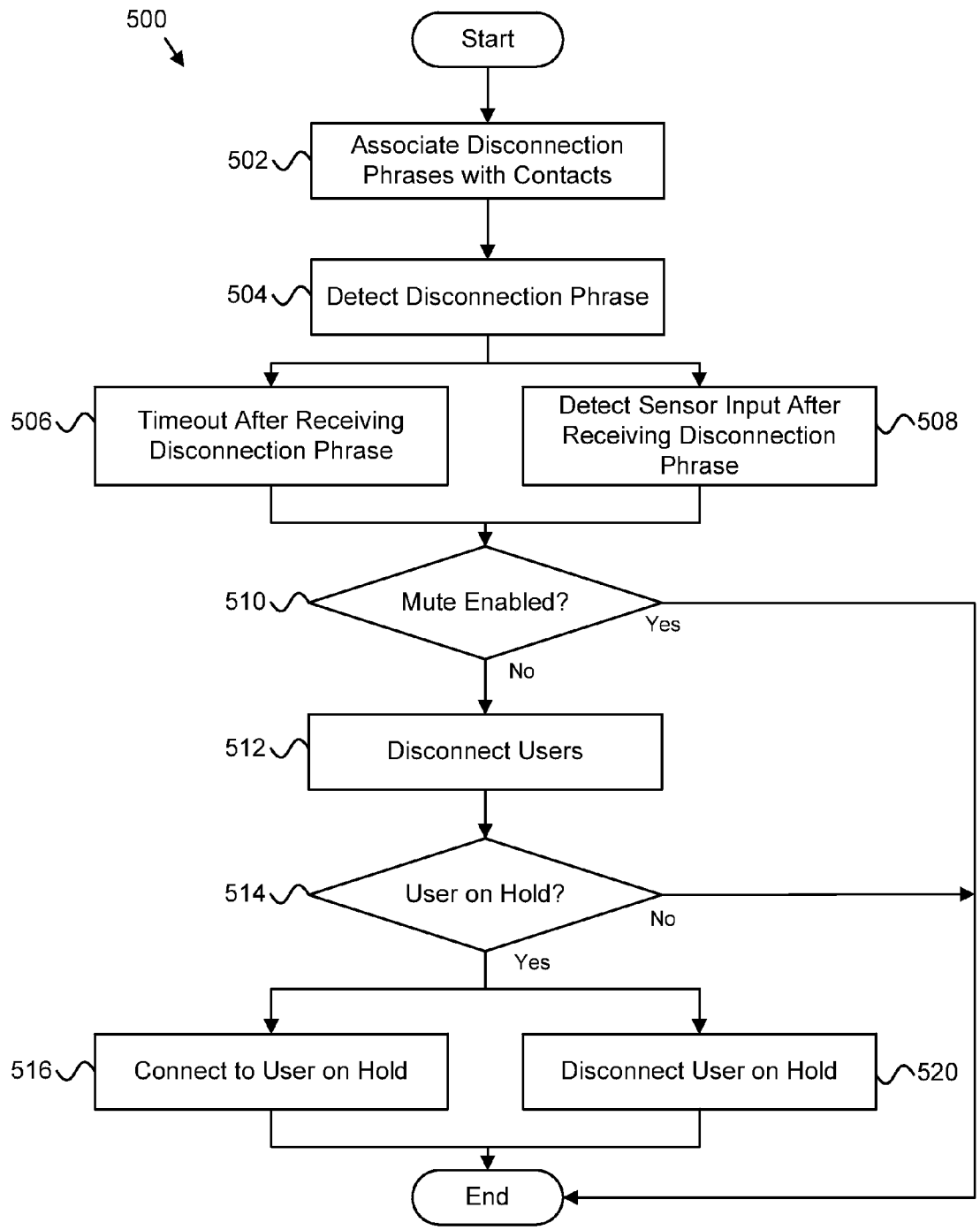
FIG. 5 is a schematic flow chart diagram illustrating one embodiment of another method for intelligent communication disconnect.

FIG. 5 is a schematic flow chart diagram illustrating one embodiment of another method 500 for intelligent communication disconnect. In one embodiment, the method 500 begins and the contacts module 302 associates 502 a disconnection phrase with a user of the plurality of users such that communications with the user are disconnected in response to detecting the disconnection phrase associated with the user. In one embodiment, the contacts module 302 associates a disconnection phrase with the user in response to the disconnection phrase being assigned to the user. In a further embodiment, the contacts module 302 associates a disconnection phrase with the user in response to determining the disconnection phrase was used prior to disconnecting a communication with the user.

In one embodiment, the monitor module 202 detects 504 a disconnection phrase during an ongoing communication between a plurality of users. In some embodiments, the monitor module 202 also detects 506 a period of time after receiving the disconnection phrase where no input is received, which may indicate the end of the conversation. In certain embodiments, the monitor module 202 also detects 508 sensor input after receiving the disconnection phrase. The settings module 304, in one embodiment, in response to the monitor module 202 detecting a disconnection cue, determines 510 whether the mute setting is enabled. If not, the disconnection module 204 disconnects from the ongoing communication.

The hold module 306, in one embodiment, determines 514 whether a user has been placed on hold prior to or during the ongoing communication. If the hold module 306 determines 514 that there is a user on hold, the hold module 306 may connect 516 to the user on hold, in one embodiment, or disconnect 520 from the connection with the user on hold, and the method 500 ends. If the settings module 304 determines 510 that the mute setting is enabled or the hold module 306 determines 514 that a user has is not on hold, the method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
 a processor;
 a memory that stores code executable by the processor, the code comprising:
  code that associates a disconnection phrase with a user, the disconnection phrase comprising a phrase that indicates the user is done participating in an ongoing communication when spoken by the user;
  code that detects a disconnection cue during an ongoing communication between a plurality of users, the disconnection cue comprising a disconnection phrase;
  code that determines whether the disconnection phrase is associated with a user of the plurality of users; and
  code that disconnects the user associated with the disconnection phrase from the ongoing communication in response to determining the disconnection phrase is associated with the user.

2. The apparatus of claim 1, wherein a disconnection phrase is associated with the user in response to the disconnection phrase being assigned to the user.

3. The apparatus of claim 1, wherein a disconnection phrase is associated with the user in response to determining the disconnection phrase was used prior to disconnecting a communication with the user.

4. The apparatus of claim 1, wherein the disconnection cue further comprises input received from one or more sensors.

5. The apparatus of claim 4, wherein the one or more sensors comprise one or more of an accelerometer, a proximity sensor, and an orientation sensor.

6. The apparatus of claim 1, wherein the disconnection cue further comprises a period of time without receiving input after detecting the disconnection phrase.

7. The apparatus of claim 1, further comprising code that determines whether a mute setting is enabled, wherein the ongoing communication is disconnected in response to the mute setting being disabled.

8. The apparatus of claim 1, further comprising code that determines whether a user was placed on hold during the ongoing communication, wherein a connection to the user is restored in response to disconnecting from the ongoing communication.

9. The apparatus of claim 1, further comprising code that sends a notification that the ongoing communication has not been disconnected.

10. The apparatus of claim 1, wherein the ongoing communication comprises a telephone communication.

11. A method comprising:
- associating a disconnection phrase with a user, the disconnection phrase comprising a phrase that indicates the user is done participating in an ongoing communication when spoken by the user;
- detecting, by use of a processor, a disconnection cue during an ongoing communication between a plurality of users, the disconnection cue comprising a disconnection phrase;
- determining whether the disconnection phrase is associated with a user of the plurality of users; and
- disconnecting the user associated with the disconnection phrase from the ongoing communication in response to determining the disconnection phrase is associated with the user.

12. The method of claim 11, wherein a disconnection phrase is associated with the user in response to the disconnection phrase being assigned to the user.

13. The method of claim 11, wherein a disconnection phrase is associated with the user in response to determining the disconnection phrase was used prior to disconnecting a communication with the user.

14. The method of claim 11, wherein the disconnection cue further comprises input received from one or more sensors.

15. The method of claim 11, wherein the disconnection cue further comprises a period of time without receiving input after detecting the disconnection phrase.

16. The method of claim 11, further comprising determining whether a mute setting is enabled, wherein the ongoing communication is disconnected in response to the mute setting being disabled.

17. The method of claim 11, further comprising sending a notification that the ongoing communication has not been disconnected.

18. A program product comprising a non-transitory computer readable storage medium that stores code executable by a processor, the executable code comprising code to perform:
- associating a disconnection phrase with a user, the disconnection phrase comprising a phrase that indicates the user is done participating in an ongoing communication when spoken by the user;
- detecting a disconnection cue during an ongoing communication between a plurality of users, the disconnection cue comprising a disconnection phrase;
- determining whether the disconnection phrase is associated with a user of the plurality of users; and
- disconnecting the user associated with the disconnection phrase from the ongoing communication in response to determining the disconnection phrase is associated with the user.

* * * * *